(12) United States Patent
Thesling

(10) Patent No.: US 8,077,651 B2
(45) Date of Patent: Dec. 13, 2011

(54) PACKET REFORMATTING FOR DOWNSTREAM LINKS

(75) Inventor: William H. Thesling, Hudson, OH (US)

(73) Assignee: ViaSat, Inc., Carlsbad, CA (US)

( * ) Notice: Subject to any disclaimer, the term of this patent is extended or adjusted under 35 U.S.C. 154(b) by 654 days.

(21) Appl. No.: 12/174,222

(22) Filed: Jul. 16, 2008

(65) Prior Publication Data

US 2009/0307727 A1    Dec. 10, 2009

Related U.S. Application Data

(63) Continuation of application No. PCT/US2007/079523, filed on Sep. 26, 2007.

(60) Provisional application No. 60/827,988, filed on Oct. 3, 2006.

(51) Int. Cl.
*H04B 7/185* (2006.01)

(52) U.S. Cl. ................ 370/316; 370/401; 455/11.1

(58) Field of Classification Search ............... None
See application file for complete search history.

(56) References Cited

U.S. PATENT DOCUMENTS

| | | | | |
|---|---|---|---|---|
| 7,054,902 | B2 * | 5/2006 | Toporek et al. | 709/203 |
| 7,283,803 | B2 * | 10/2007 | Karaoguz et al. | 455/406 |
| 7,826,830 | B1 * | 11/2010 | Patel et al. | 455/414.1 |
| 2002/0083342 | A1 * | 6/2002 | Webb et al. | 713/201 |
| 2002/0199019 | A1 | 12/2002 | Battin et al. | |
| 2003/0079022 | A1 * | 4/2003 | Toporek et al. | 709/227 |

FOREIGN PATENT DOCUMENTS

| | | |
|---|---|---|
| CN | 101573902 A | 11/2009 |
| WO | WO 2008/097368 A2 | 8/2008 |

OTHER PUBLICATIONS

PCT International Search Report and Written Opinion, dated Apr. 6, 2009, PCT/US2007/079523, filed Sep. 26, 2007.
DVB BlueBook A116, Digital Video Broadcasting, Generic Stream Encapsulation (GSE) Protocol, DVB Document A116, May 2007.
First Office Action for Chinese Patent Application No. 200780033919.9 with English translation dated Aug. 12, 2010, 21 pages.
Notification of Publication and of entry into Substantive Examination Procedures for Invention Patent Application with English Translation dated Nov. 20, 2009, 2 pages (Application No. 200780033919.9).

\* cited by examiner

*Primary Examiner* — Bob Phunkulh
(74) *Attorney, Agent, or Firm* — Kilpatrick Townsend & Stockton LLP

(57) ABSTRACT

Systems, devices, and methods are described for formatting packets for downstream satellite links. The generation of a broadband wireless signal is described, the signal to be transmitted between a gateway and subscriber terminals via satellite. Respective data link layer addresses for the subscriber terminals may each be associated with one or more shortened identifiers for use in lieu of the associated data link layer addresses. This addressing may be included in a stream encapsulation header for an appended data packet. One or more such headers and their appended data packets may then be encapsulated in a baseband frame for transmission within a physical layer frame. Data packets may be fragmented across physical layer frames, and a range of novel formatting techniques may be used to implement the fragmentation.

24 Claims, 14 Drawing Sheets

700
Forward Channel
Diagram

US 8,077,651 B2

PACKET REFORMATTING FOR DOWNSTREAM LINKS

CROSS-REFERENCES TO RELATED APPLICATIONS

This application is a Continuation of International Application No. PCT/US2007/079523, filed Sep. 26, 2007, entitled "Packet Formatting for Downstream Links", and claims the benefit thereof under 35 U.S.C. 120, which claims the benefit under 35 U.S.C. 119(e) of U.S. Provisional Patent Application No. 60/827,988, filed Oct. 3, 2006, entitled "Packet Reformatting for Downstream Links". This application hereby incorporates by reference herein the content of the aforementioned applications in their entirety and for all purposes.

This application expressly incorporates by reference each of the following patent applications in their entirety for all purposes:

PCT Application Serial No. PCT/US2007/079577, filed on Sep. 26, 2007, entitled "Improved Spot Beam Satellite Ground Systems";

PCT Application Serial No. PCT/US2007/079561, filed on Sep. 26, 2007, entitled "Multi-Service Provider Subscriber Authentication";

PCT Application Serial No. PCT/US2007/079565, filed on Sep. 26, 2007, entitled "Large Packet Concatenation In Satellite Communication System";

PCT Application Serial No. PCT/US2007/079569, filed on Sep. 26, 2007, entitled "Upfront Delayed Concatenation In Satellite Communication System";

PCT Application Serial No. PCT/US2007/079571, filed on Sep. 26, 2007, entitled "Map-Trigger Dump Of Packets In Satellite Communication System";

PCT Application Serial No. PCT/US2007/079563, filed on Sep. 26, 2007, entitled "Web/Bulk Transfer Preallocation Of Upstream Resources In A Satellite Communication System";

PCT Application Serial No. PCT/US2007/079567, filed on Sep. 26, 2007, entitled "Improved Spot Beam Satellite Systems";

PCT Application Serial No. PCT/US2007/079523, filed on Sep. 26, 2007, entitled "Packet Reformatting For Downstream Links"; and PCT Application Serial No. PCT/US2007/079541, filed on Sep. 26, 2007, entitled "Upstream Resource Allocation For Satellite Communications".

BACKGROUND OF THE INVENTION

The present invention relates to wireless communications in general and, in particular, to a satellite communications network.

Consumer broadband satellite services are gaining traction with the start up of network services using Ka band satellites. While such satellite systems may provide multi-gigabit per second (Gbps) per satellite overall capacity, current designs of such systems inherently limit the number of customers who may be served with sufficient bandwidth. For example, because this capacity may be used across numerous coverage areas, the bandwidth to each subscriber may be limited.

While existing designs have a number of capacity limitations, the demand for such broadband services continues to grow. The past few years have seen strong advances in communications and processing technology. This underlying technology, in conjunction with selected novel packet formatting techniques, may be utilized for satellite communications systems and components configured to address this demand.

BRIEF SUMMARY OF THE INVENTION

Systems, devices, and methods are described which may be utilized in formatting packets for downstream satellite links. In certain embodiments, packets may be encapsulated according to various novel formatting techniques to reduce certain overhead associated with some traditional techniques.

In one set of embodiments, the generation of a broadband wireless signal is described. The signal may be generated by a gateway for transmission to subscriber terminals via satellite. Log-in information is received at the gateway from the subscriber terminals. The subscriber terminals are each associated with a different data link layer address. The respective data link layer addresses may then each be associated with a shortened identifier for use in lieu of the associated data link layer addresses. A determination is made, for purposes of an addressing label, whether the identifier for a first data link layer address is to be used in lieu of the first data link layer address for purposes of addressing. This addressing may be included in a stream encapsulation header for an appended data packet (e.g., an Internet Protocol packet). One or more such headers and their appended data packets may then be encapsulated in a baseband frame for transmission within a physical layer frame.

In other embodiments, there may be more than two formats for address labels, or a determination may be made that the address label is to be omitted altogether. The determination as to which addressing format to use may be based upon a load at the gateway, bandwidth utilization on applicable sub-channels, or other factors. Regarding use of the identifiers, they may be predetermined or assigned dynamically. Sets of data may be fragmented between physical layer frames, and a range of novel formatting techniques may be used to implement the fragmentation.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In various embodiments, a broadband wireless signal is generated. The signal may be transmitted from a gateway to subscriber terminals via satellite. Log-in information is first received from the subscriber terminals, each associated with a different data link layer address. The respective data link layer addresses may then each be associated with a shortened identifier for use in lieu of the associated data link layer addresses. A determination is made, for purposes of an addressing label, whether the identifier for a first data link layer address is to be used in lieu of the first data link layer address for purposes of addressing. This addressing label may be included in a stream encapsulation header for an appended data packet (e.g., an Internet Protocol packet). One or more such headers and their appended data packets may then be encapsulated in a baseband frame for transmission within a physical layer frame.

The description herein provides exemplary embodiments only, and is not intended to limit the scope, applicability or configuration of the invention. Rather, the description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different than that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
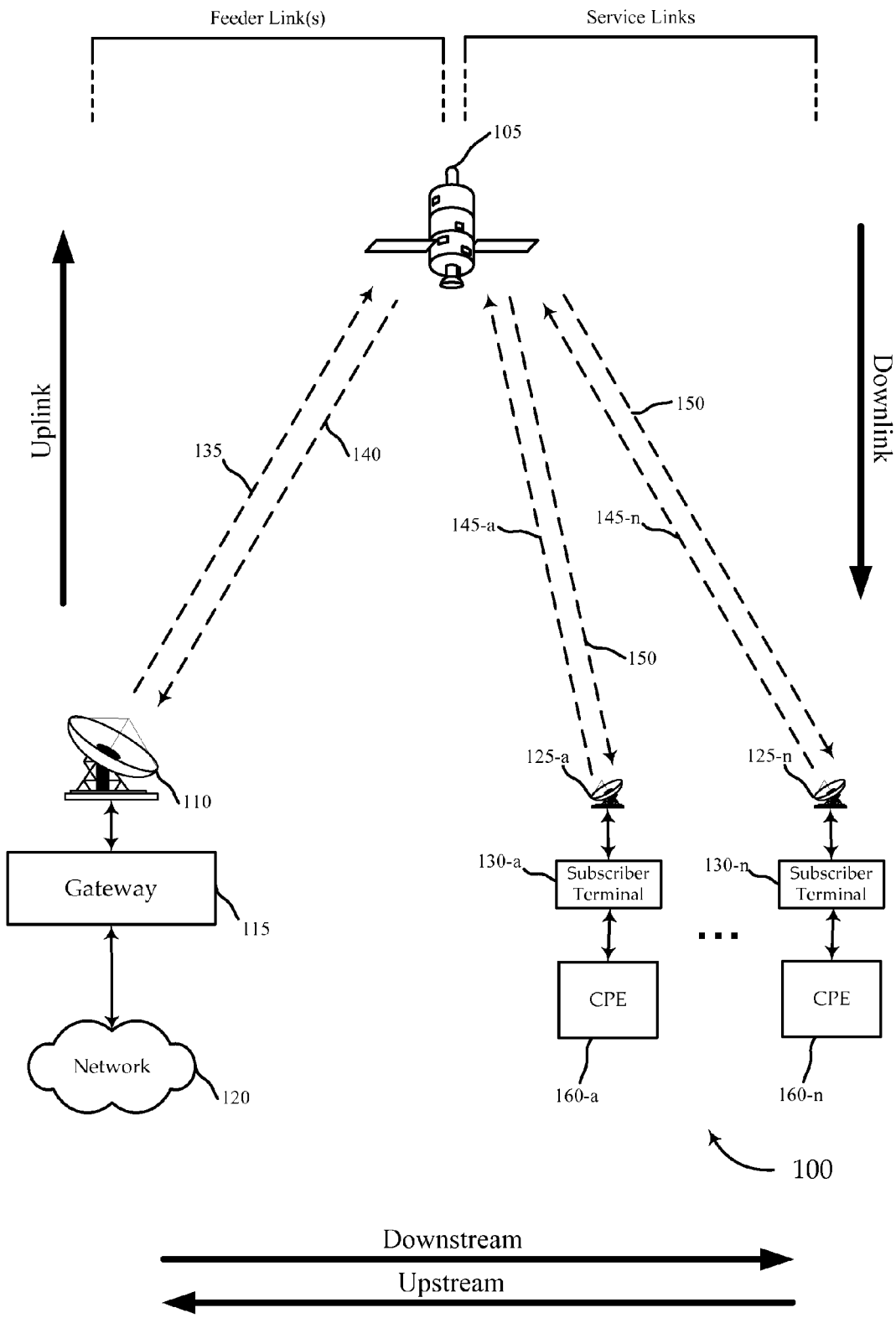
FIG. 1 is a block diagram of a satellite communications system configured according to various embodiments of the invention.

Referring first to FIG. 1, a block diagram illustrates an example satellite communications system 100 configured according to various embodiments of the invention. While a satellite communications system is used to illustrate various aspects of the invention, it is worth noting that certain principles set forth herein are applicable to a number of other wireless systems, as well. The satellite communications system 100 includes a network 120, such as the Internet, interfaced with a gateway 115 that is configured to communicate with one or more subscriber terminals 130, via a satellite 105.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. Many other examples are possible and apparent to those skilled in the art in light of this disclosure. The network may connect the gateway 115 with other gateways (not pictured), which are also in communication with the satellite 105, and which may share information on link conditions and other network metrics.

The gateway 115 provides an interface between the network 120 and the subscriber terminal 130. The gateway 115 may be configured to receive data and information directed to one or more subscriber terminals 130, and format the data and information (using the novel techniques described herein) for delivery downstream to the respective subscriber terminals 130 via the satellite 105. Similarly, the gateway 115 may be configured to receive upstream signals from the satellite 105 (e.g., log-in information from one or more subscriber terminals 130) directed to a destination in the network 120, and can format the received signals for transmission through the network 120.

A device (not shown) connected to the network 120 may, therefore, communicate with one or more subscriber terminals 130 through the gateway 115. Data and information, for example IP datagrams, may be sent from a device in the network 120 to the gateway 115. The gateway 115 may format a frame in accordance with a physical layer definition for transmission to the satellite 105 via a downstream link 135. The novel formatting techniques described herein may, therefore, be used at the gateway for transmission via the downstream links. A variety of physical layer transmission modulation and coding techniques may be used with certain embodiments of the invention, including those defined with the DVB-S2 and WiMAX standards, or various modifications thereof. In a number of embodiments, the gateway 115 utilizes Adaptive Coding and Modulation ("ACM") in conjunction with one or more of the formatting techniques described herein to direct traffic to the individual terminals. The gateway 115 may use a broadcast signal, with a modulation and coding (modcode) format adapted to the link conditions of the terminal 130 or set of terminals 130 to which the packet is directed (e.g., to account for the variable service link 150 conditions from the satellite 105 to each respective terminal 130).

The gateway 115 may use an antenna 110 to transmit the signal to the satellite 105. In one embodiment, the antenna 110 is a parabolic reflector with high directivity in the direction of the satellite and low directivity in other directions. The downstream signals 135, 150 may include, for example, one (or more) single carrier signals. Each single carrier signal may be divided in time (e.g., using TDMA or other time division multiplexing techniques) into a number of sub-channels, wherein subsets of the subscriber terminals are assigned to each sub-channel. The sub-channels may be the same size, or different sizes, and a range of options will be addressed below. In some embodiments, other channelization schemes may be integrated with or used in place of time-divided sub-channels, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception and/or transmission of signals. The satellite 105 may process the signals received from the gateway 115 and transmit the signal from the gateway 115 to one or more subscriber terminals 130. In one embodiment, the satellite 105 operates in a multi-beam mode, transmitting a number of narrow beams, each directed at a different region of the earth, allowing for frequency re-use. With such a multibeam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments, a number of configurations are possible (e.g., using LEO satellites, or using a mesh network instead of a star network), as evident to those skilled in the art.

The service signals transmitted from the satellite 105 may be received by one or more subscriber terminals 130, via the respective subscriber antenna 125. In one embodiment, the antenna 125 and terminal 130 together make up a very small aperture terminal (VSAT). In other embodiments, a variety of other types of antennas 125 may be used at the subscriber terminal 130 to receive the signal from the satellite 105. Each of the subscriber terminals 130 may be a single user terminal or, alternatively, be a hub or router (not pictured) that is coupled with multiple user terminals. Each subscriber terminal 130 may be connected to consumer premises equipment (CPE) 160 (e.g., computers, local area networks, Internet appliances, wireless networks, etc.).

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time Division Multiple Access (TDMA) scheme is then employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as TDMA, FDMA, OFDMA, CDMA, or any number of hybrid or other schemes known in the art.

A subscriber terminal 130, using the upstream links, may transmit log-in information and information related to signal quality to the gateway 115 via the satellite 105. The signal quality may be a measured signal-to-noise ratio, an estimated signal-to-noise ratio, a bit error rate, a received power level, or any other communication link quality indicator. The subscriber terminal 130 itself may measure or estimate the signal quality, or it may pass information measured or estimated by other devices. A subscriber terminal 130 may also transmit data and information to a network 120 destination via the satellite 105 and gateway 115. The subscriber terminal 130 transmits the signals via the upstream uplink 145 to the satellite 105 using the antenna 125. A subscriber terminal 130 may transmit the signals according to a variety of physical layer transmission modulation and coding techniques. In various embodiments, the physical layer techniques may be the same for each of the links 135, 140, 145, 150, or may be different. The gateway 115 may, in some embodiments, use this signal quality information to implement Adaptive Coding and Modulation (ACM), adjusting the modcode formats to each terminal or set of terminals based on their link conditions.

In one embodiment, a gateway 115 includes a Satellite Modem Termination System (SMTS), which is based at least in part on the Data-Over-Cable Service Interface Standard (DOCSIS). The SMTS in this embodiment includes a bank of modulators and demodulators for processing signals to be transmitted to or signals received from subscriber terminals 130. The SMTS in the gateway 115 performs the real-time scheduling of the signal traffic through the satellite 105, and provides the interfaces for the connection to the network 120. In other embodiments, the scheduling operations may be performed by other components or devices employing other standards.

In this embodiment, the subscriber terminals 130 use portions of DOCSIS-based modem circuitry, as well. Therefore, DOCSIS-based resource management, protocols, and schedulers may be used by the SMTS for efficient provisioning of messages. DOCSIS-based components may be modified, in various embodiments, to be adapted for use therein. Thus, certain embodiments may utilize certain parts of the DOCSIS specifications, while customizing others.

While a satellite communications system 100 applicable to various embodiments of the invention is broadly set forth above, a particular embodiment of such a system 100 will now be described. In this particular example, approximately 2 gigahertz (GHz) of bandwidth is to be used, comprising four 500 megahertz (MHz) bands of contiguous spectrum. Employment of dual-circular polarization results in usable frequency comprising eight 500 MHz non-overlapping bands with 4 GHz of total usable bandwidth. This particular embodiment employs a multi-beam satellite 105 with physical separation between the gateways 115 and subscriber spot beams, and configured to permit reuse of the frequency on the various links 135, 140, 145, 150. A single Traveling Wave Tube Amplifier (TWTA) may be used for each service link spot beam on the downstream downlink, and each TWTA is operated at full saturation for maximum efficiency. A single wideband carrier signal, for example using one of the 500 MHz bands of frequency in its entirety, fills the entire bandwidth of the TWTA, thus allowing a reduced number of space hardware elements. Spotbeam size and TWTA power may be optimized to achieve maximum flux density on the earth's surface of −118 decibel-watts per meter squared per megahertz ($dbW/m^2$ MHz).

Figure 2:
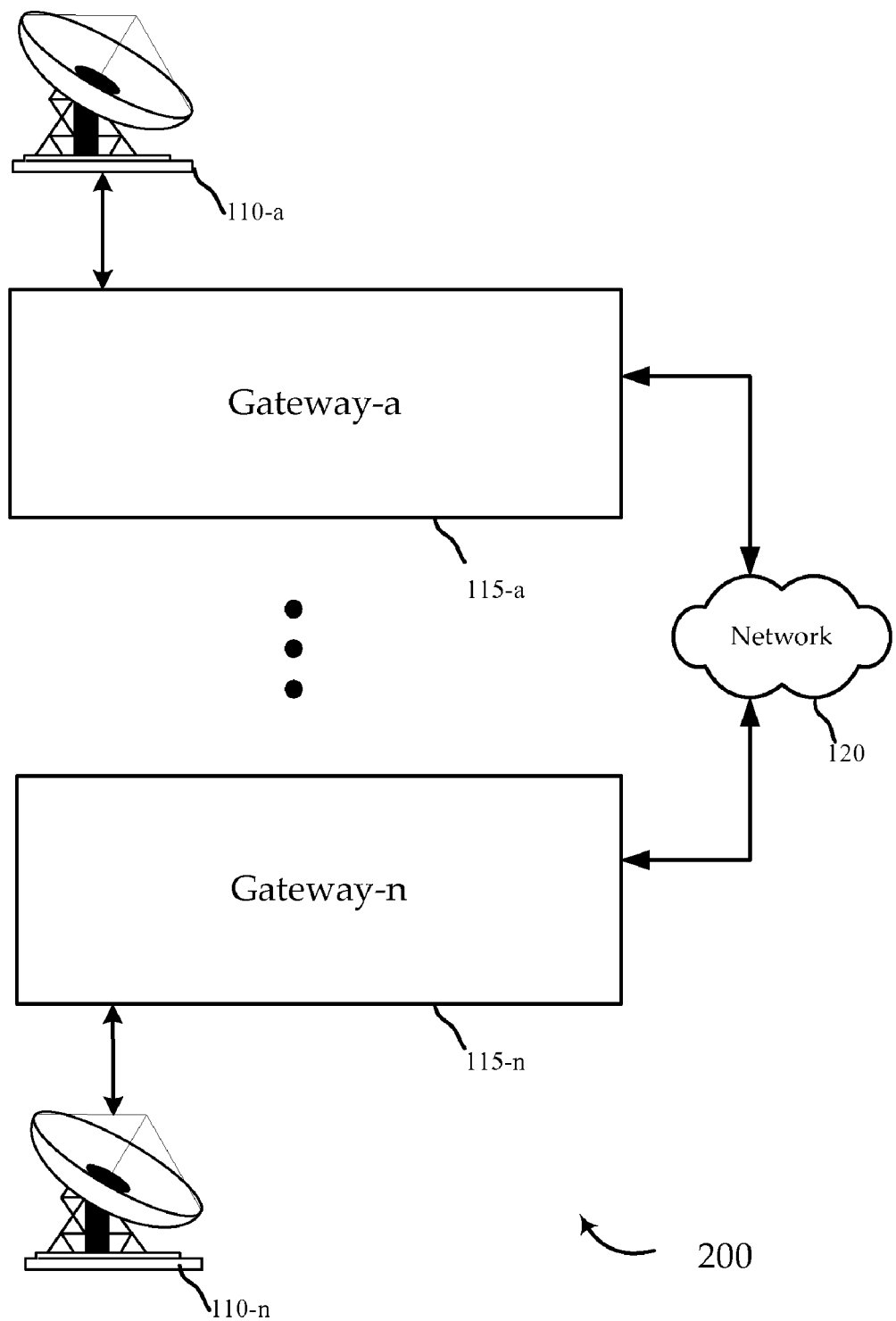
FIG. 2 is a block diagram of a ground system of gateways configured according to various embodiments of the invention.

Referring next to FIG. 2, an embodiment of a ground system 200 of gateways 115 is shown in block diagram form. One embodiment may have fifteen active gateways 115 (and possibly spares) to generate sixty service spot beams, for example. The ground system 200 includes a number of gateways 115 respectively connected with antennas 110. The gateways 115 are also each connected to a network 120.

In one embodiment, a gateway 115 (e.g., gateway 115 of FIG. 1) may upconvert and amplify a baseband signal (including data received from the network 120 or another gateway, and formatted according to various embodiments of the invention) for transmission through the downstream link 135 via the antenna 110 to a particular subscriber terminal 130. Each gateway 115 may also downconvert the upstream links 140, and perform other processing as explained below (perhaps for forwarding through the network 120). Each gateway 115 may process signals to allow the subscriber terminals 130 to log-in, and request and receive information, and may schedule bandwidth. Additionally, a gateway 115 may provide configuration information and receive status from the subscriber terminals 130. Any requested or otherwise received information may be forwarded through the network.

Figure 3:
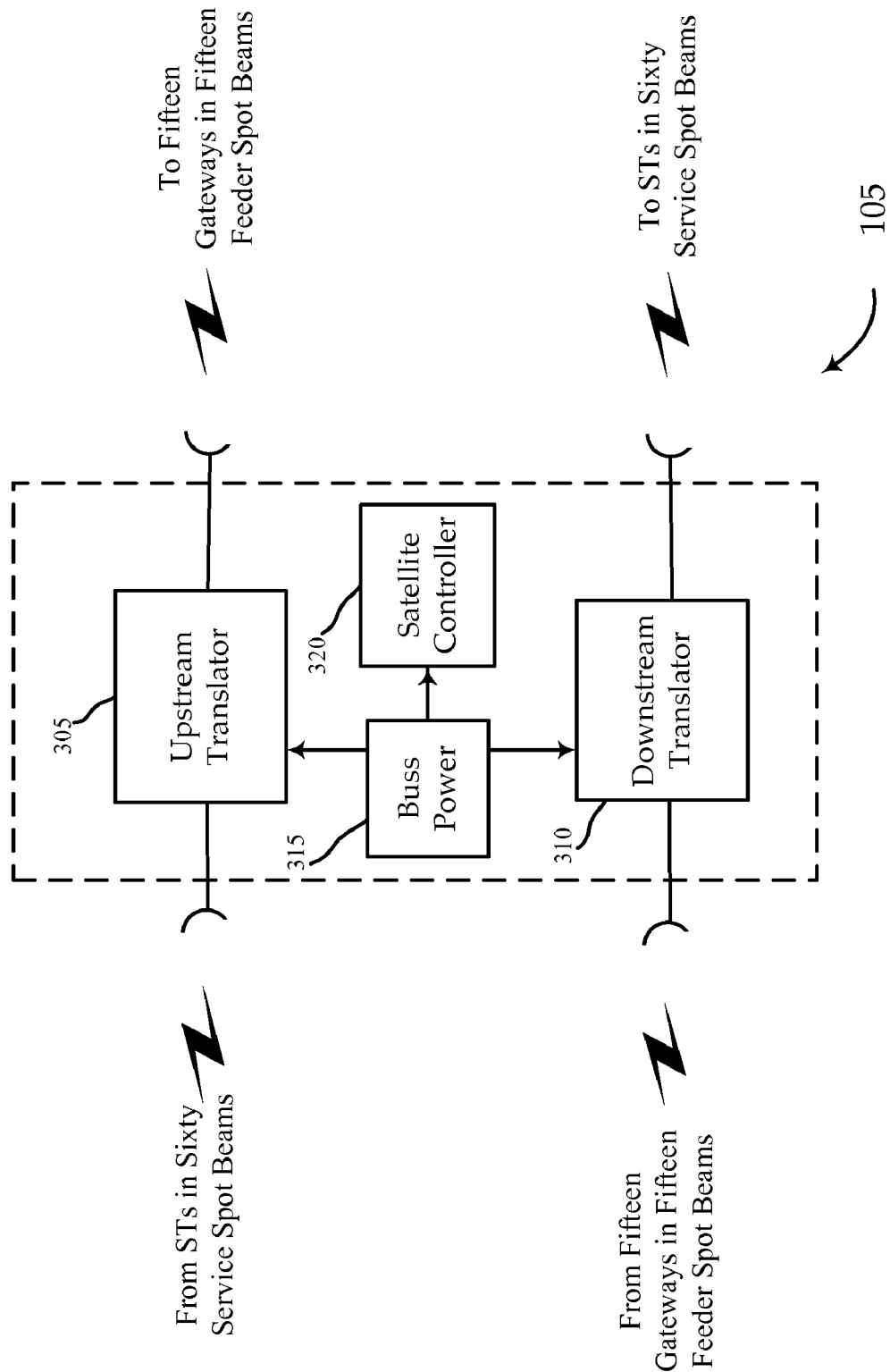
FIG. 3 is a block diagram of a satellite configured according to various embodiments of the invention.

Referring next to FIG. 3, an embodiment of a satellite 105 is shown in block diagram form. The satellite 105 in this embodiment communicates with fifteen gateways 115 and a number of subscriber terminals 130 using sixty feeder and service spot beams. Other embodiments could use more or fewer gateways/spot beams. There may be any number of subscriber terminals 130 divided by geography between the service link spot beams. Buss power 315 is supplied using a power source such as chemical fuel, nuclear fuel, and/or solar energy. A satellite controller 320 is used to maintain altitude and otherwise control the satellite 105. Software updates to the satellite 105 can be uploaded from the gateway 115 and performed by the satellite controller 320.

Information passes in two directions through the satellite 105. A downstream translator 310 receives information from the fifteen gateways 115 (e.g., formatted according to embodiments of the invention) for relay to subscriber terminals 130 using sixty service spot beams. An upstream translator 305 receives information from the subscriber terminals 130 occupying the sixty spot beam areas and relays that information (e.g., log-in or signal quality information) to the fifteen gateways 115. This embodiment of the satellite can switch carrier frequencies in the downstream or upstream processors 310, 305 in a "bent-pipe" configuration, but other embodiments could do baseband switching between the various forward and return channels. The frequencies and polarization for each spot beam may be programmable or preconfigured.

Figure 4:
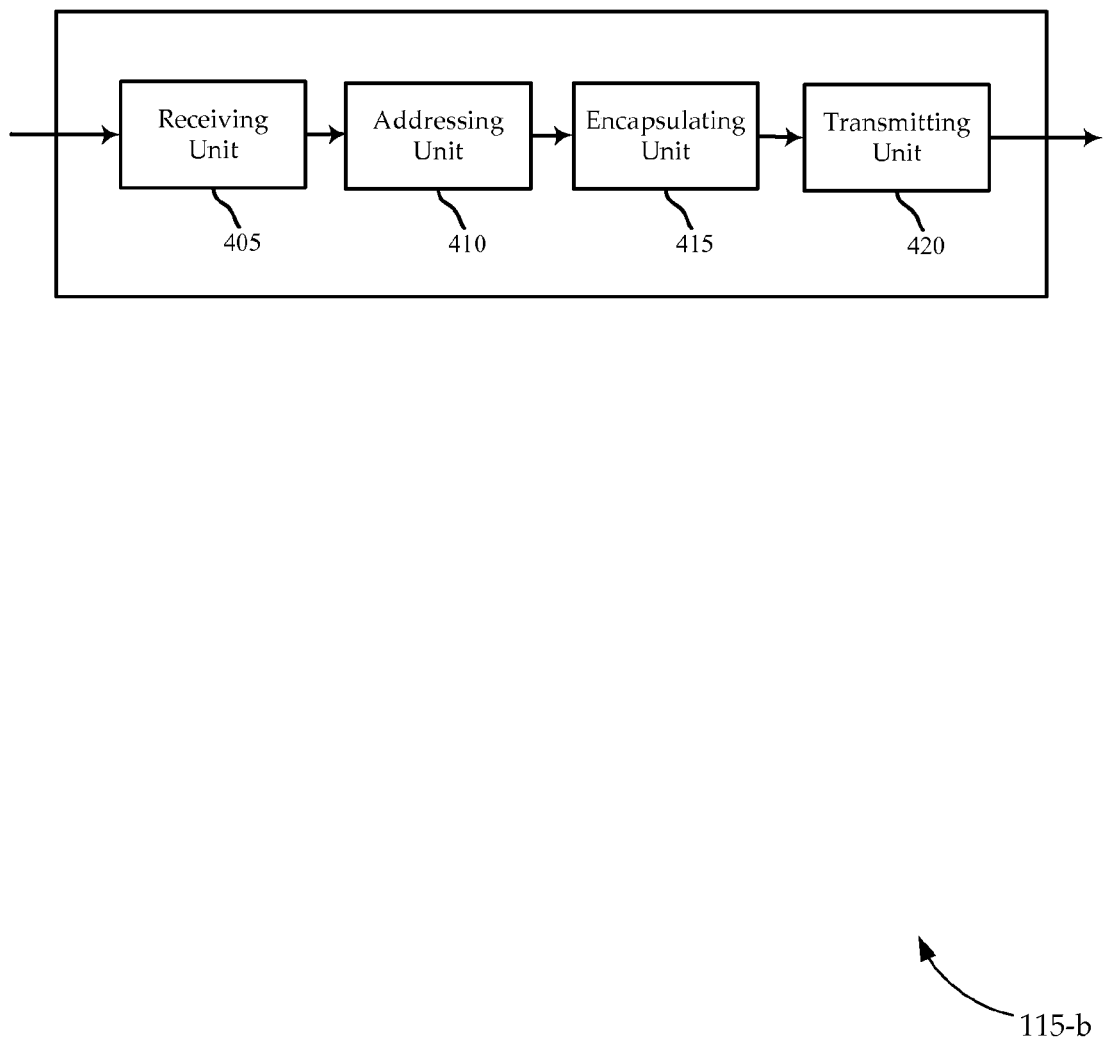
FIG. 4 is a block diagram of a gateway device configured according to various embodiments of the invention.

Referring next to FIG. 4, an embodiment of a gateway 115-b (e.g., the gateway 115 of FIG. 1) is shown in block diagram form. In this embodiment, the gateway 115-b includes a receiving unit 405, an addressing unit 410, an encapsulating unit 415, and a transmitting unit 420, each in communication with each other directly or indirectly. These units of the device may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

The receiving unit 405 may be configured to receive log-in and signal quality information from the subscriber terminals (via the satellite). This information may be transmitted from the subscriber terminals 130 to the gateway 115 via the upstream links 140, 145. Alternatively, the link conditions may be received from one or more devices on the network 120, that compile link condition information passed from the subscriber terminals 130 or other sources. The receiving unit 405 may also receive a set of data (e.g., from the network 120) to be transmitted via the satellite 105 and destined for one or more subscriber terminals 130. In some embodiments, each of the different subscriber terminals 130 is associated with a data link address (e.g., a 48 bit MAC address).

The gateway also includes an addressing unit 410, which may be configured to look up or otherwise receive address information (e.g., the data link layer address) for the received data to be transmitted downstream 135, 150. The address may be parsed from a received data packet after arrival at the gateway 115, looked up in a routing table, or received in any other manner known in the art. The addressing unit 410 may also be configured to associate one or more of the data link addresses with shortened identifiers for use in lieu of the associated data link layer addresses. There may be more than one shortened identifier for each data link address (e.g., identifiers of different lengths (4 bit, 8 bit, 16 bit, 24 bit, etc.), or different types).

The addressing unit 410 may include memory to store a table of associations between data link addresses and identifier(s) for each subscriber terminal. Thus, in the table, a given subscriber terminal 130 may be associated with a data link address (e.g., received during log-in or otherwise known). The subscriber terminal may also be associated with one or more shortened identifiers. In addition, the table could include information for the subscriber terminal 130 (or a set of terminals) indicating the circumstances in which the shortened identifiers will be used. The identifiers may be assigned dynamically, which may allow the identifier length to be reduced because the pool of identifiers would be allocated only to subscriber terminals actually logged in. For dynamic assignment, the gateway may transmit the assigned identifier to the applicable subscriber terminal 130. In one embodiment, the same identifiers may be reused in different sub-channels, allowing for even further reduction. In another embodiment, the identifiers may be predetermined for each subscriber terminal.

The addressing unit may then determine (for the received data to be transmitted to a particular subscriber terminal) whether an identifier associated with the first data link layer address is to be used in lieu of the first data link layer address for addressing. As noted above, there may be one or more identifiers associated with each subscriber terminal. The determination may, therefore, also identify the particular identifier to use, or may specify that the addressing label should be omitted. There are a number of factors that may be applied in determining whether the identifier is to be used (and which identifier to use, if any). For example, the load at the gateway device 115-b may be a factor, as higher traffic loads could trigger the use of the shortened identifiers. In addition, a bandwidth utilization threshold could be used, wherein the identifiers may be used as the available downstream bandwidth decreases. In addition, subscriber terminals 130 may each be associated with only certain sub-channels, and the bandwidth on the allocated (or available) sub-channels for a given subscriber terminal 130 may dictate whether the identifiers will be used. In still other embodiments, preferences for identifier use for certain subsets of subscriber terminals may be received from subscriber terminals and/or stored at the gateway. Based on one or more of the above determinations, the addressing format to be used for the received data may be determined.

The encapsulating unit 415, in communication with the addressing unit 410, may then generate and insert the applicable addressing (e.g., the data link layer address, one of the identifiers, or nothing) into a header encapsulating the received data to be transmitted to the subscriber terminal. The received data may be one or more IP packets, MPEG packets, DOCSIS packets, control packets, other packet types, and so on. The addressing label may be inserted into a stream encapsulation header which is appended to the applicable data packet. The encapsulating unit may encapsulate one or more such headers and appended packets in a baseband frame for transmission within a physical layer frame formatted according to a standard or modified version of DVB-S2. It is worth noting that the received data may be composed of more than one type of data, and the header may include an extendible type field to indicate the types and boundaries of the data included. The remainder of the description will include additional discussion of these addressing and formatting techniques, and a range of implementation options.

As for the link conditions received from the subscriber terminals 130 (or from other sources), they may be organized and stored in an address/link condition table, located in memory (not shown). This table may be used by the encapsulating unit 415 of the gateway 115 to look up the signal quality of a subscriber terminal 130 to which a packet (formatted in the manner described above) is destined. In the table, a variety of address mechanisms may be used to identify particular subscriber terminals, including a destination MAC, one of the identifiers discussed above, a destination VLAN-ID, a Destination Internet Protocol ("DIP") address, another private addressing ID, or any other set of data comprising or otherwise correlated with a destination address. It is also worth noting that a number of other data structures may also be used to relate an address to signal quality.

In addition, a modcode table (or other data structure associating signal quality and modcode) may be maintained and accessed by the encapsulating unit 415 (e.g., by an ACM unit therein). The encapsulating unit 415 may use the modcode table to determine the modcode to be used for packets destined for a subscriber terminal 130 operating in a given signal quality range. The table may contain a number of modcode formats, each corresponding to a specified signal quality range. Different modcode formats may have different codeword sizes, code rates, modulation schemes, and pilot insertions. Thus, using the signal quality attributed to a destination link for a packet, a signal quality range encompassing the link may be identified, and the appropriate modcode may be selected. Although certain embodiments utilize ACM, a number of embodiments described herein apply to non-ACM systems, devices, and components, as well.

Figure 5A:
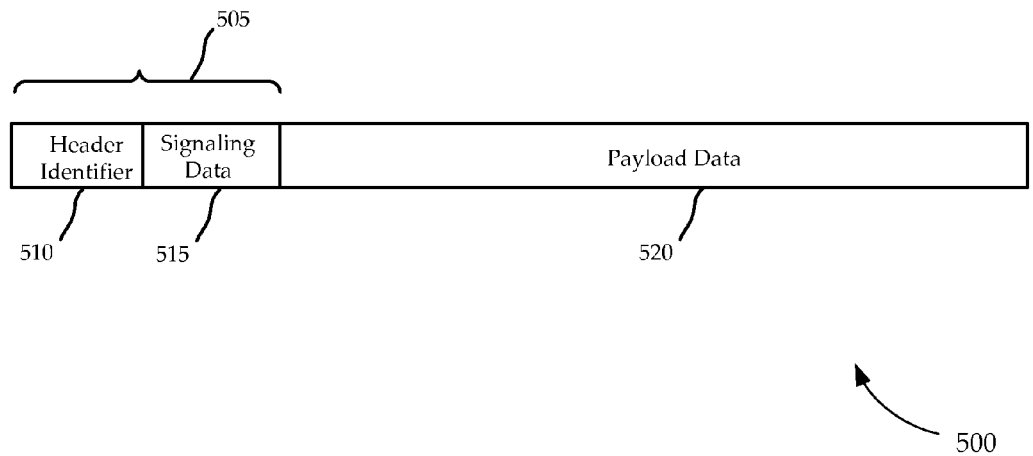
FIGS. 5A and 5B are block diagrams of a frame formatted according to various embodiments of the invention.

With the applicable modcode selected, the encapsulating unit 415 may encapsulate data (e.g. using the addressing and formatting described above) to be transmitted via the satellite 105 to a subscriber terminal 130. FIG. 5A is a block diagram illustrating an example frame format 500 that may be used. A physical layer header 505 includes a header identifier 510 and signaling data 515. The header identifier 510 may be one of a set of unique identifiers, so that its known sequence may be readily identified. For example, the destination subscriber terminal 130 may use known patterns (one or more valid header identifiers) to correlate with a received signal. Destination terminals 130 may also be configured to store different sets of header identifiers 510, and thus frames may filter based on header identifier 510.

The remainder of header 505, the signaling data 515, includes the modcode data and a sub-channel identifier. The modcode data identifies the modulation and coding (e.g., the particular codeword sizes, code rates, modulation schemes, and pilot insertions) for encoded and modulated payload data 520 that is appended to the header 505. The header 505 (or parts thereof) may be protected by very low code rates so that it may be reliably received during poor SNR conditions. The encoded and modulated payload data 520, however, is in many embodiments adaptively coded on a per-terminal (or per-set of terminals) basis. By way of example, a subscriber terminal 130 receiving a transmitted signal at a very low SNR may receive a frame 500 in which the encoded and modulated payload data 520 has been encoded at a very low code rate and at a very low order modulation. Conversely, a terminal 130 receiving a transmitted signal at a very high SNR may receive a frame 500 in which the encoded and modulated payload data 520 has been encoded at a very high code rate and at a very high order modulation.

In addition, the signaling data includes a sub-channel identifier configured to identify different frames as belonging to particular sub-channels. By utilizing sub-channel identifiers in a physical layer header 505, receiving devices (e.g., the subscriber terminals 130) may filter packets based on the sub-channel identifier without demodulating or decoding the payload 520. Thus, the information to be demodulated and decoded (e.g., payload data 520 directed to other sub-channels and other subscriber terminals 130) may be limited or otherwise filtered thereby (as will be discussed in more detail below). A given sub-channel may, therefore, be a fraction (e.g., ¼, ⅛, 1/16) of the downstream channel. A subscriber terminal 130 may be configured to filter a frame 500, demodulating and decoding payload data 520 only if the sub-channel identifier in the signaling data 515 matches one or more sub-channels for the terminal.

Figure 5B:
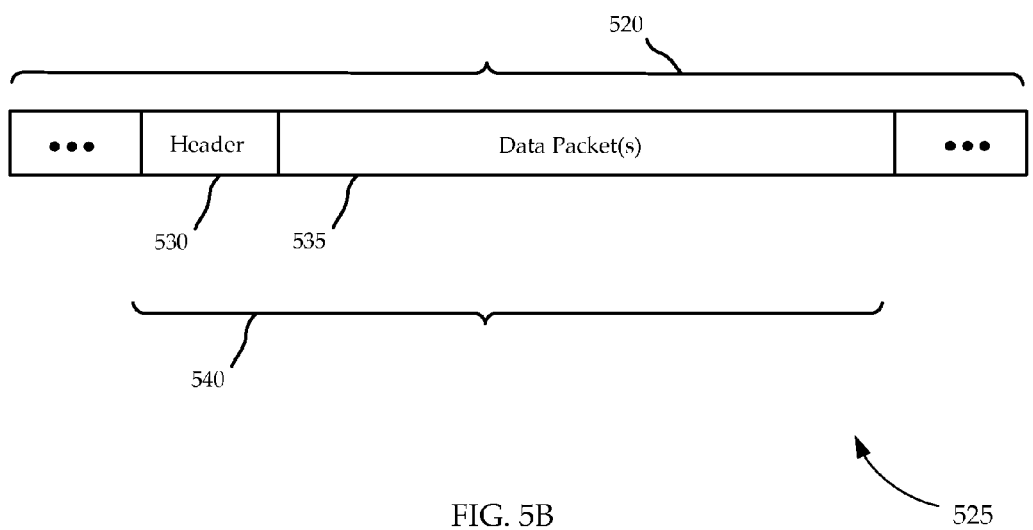

Turning to FIG. 5B, a block diagram 525 illustrates a example format for the payload data 520. The payload data 520 includes a set of data 540 composed of the header 530 and appended data packet(s) 535. The header 530 may be the stream encapsulation header described above, including the address label (data link layer address, identifier, or omitted field). The data packet(s) 535 may be one or more IP packets, MPEG packets, DOCSIS packets, control packets, other data packets, or any combination thereof. The payload data 520 be made up of a baseband frame which may include a number of such sets of data 540.

Returning to FIG. 4, the data (e.g., in the frame format 500 of FIG. 5A) may be received by a transmitting unit 420 from the encapsulating unit 415. The transmitting unit 420 may then upconvert and amplify this encapsulated data to produce a signal to be transmitted to the applicable subscriber terminal(s) 130 via an antenna 110 and satellite 105.

Figure 6A:
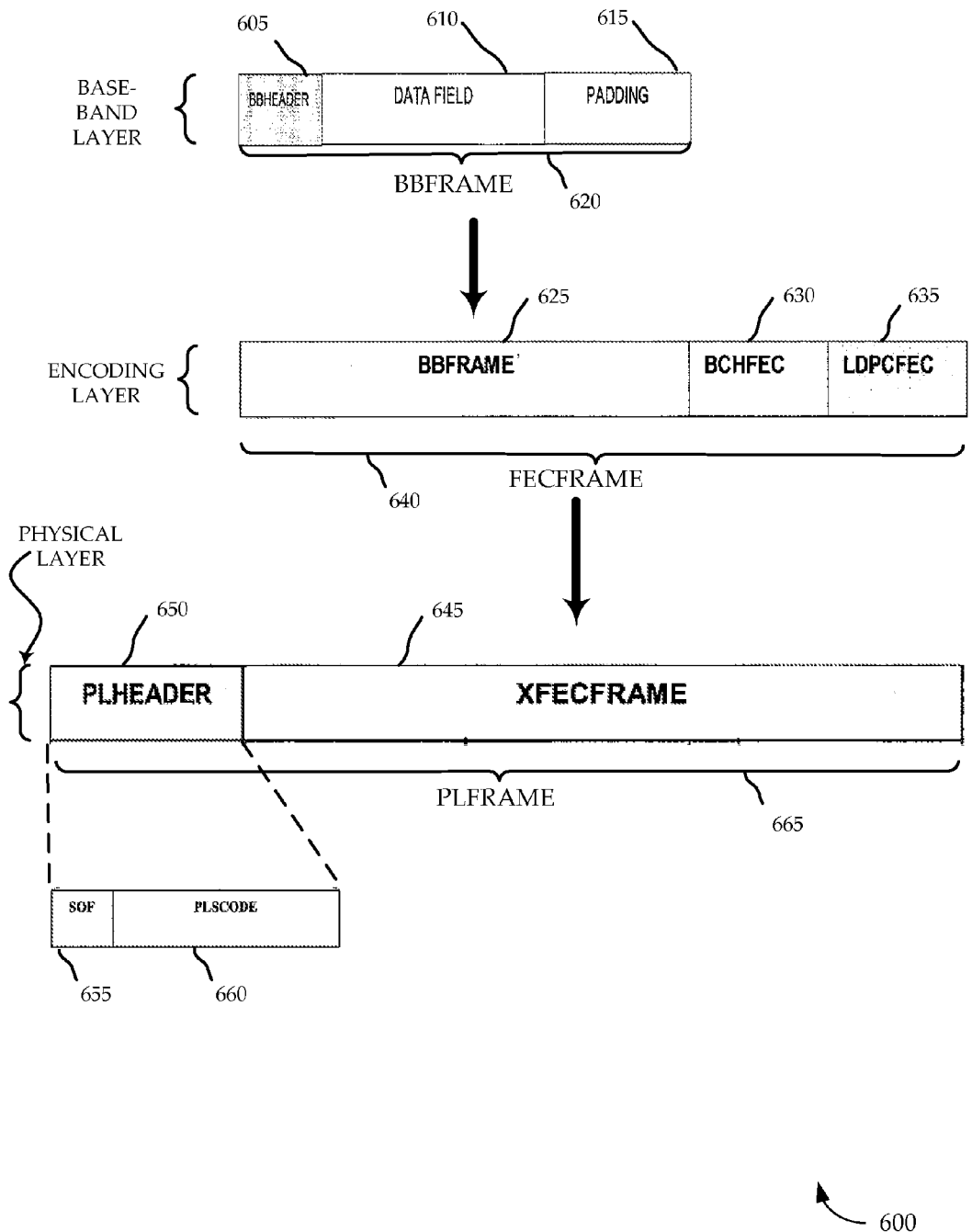
FIG. 6A is a block diagram of a modified digital video broadcast format according to various embodiments of the invention.

Turning to FIG. 6A, the framing format 600 for a frame of a modified DVB-S2 system is set forth to illustrate various aspects of the invention. The DVB-S2 frame format may be modified and used in the following manner to implement the frame 500 described with reference to FIGS. 5A and 5B. It is worth noting that in other embodiments, DVB-S, DVB-S2, WiMax, or other standards may be used, and this modified DVB-S2 format is for purposes of example only.

In one embodiment, each frame is broadcast to all terminals 130, but is only directed (e.g., using the sub-channel identifier and addressing label) at a select subscriber terminal 130 (or small groups of terminals 130). For example, the waveform may be a single carrier waveform transmitted downstream from a gateway 115 to a subscriber terminal 130 in the system 100 of FIG. 1. As noted above, while the DVB-S2 system is used as an example, the principles specified herein are applicable to a range of systems.

The header identifier 510 of FIG. 5A may be implemented as the Start of Frame (SOF) 655 of FIG. 6A, and the signaling data 515 may be implemented as a modified Physical Layer Signaling code (PLSCODE) 660. The SOF 655 is a known 26-symbol pattern. The PLSCODE is a 64-bit linear binary code, which conveys seven bits of information. In total, the SOF 655 and PLSCODE 660 occupy 90 symbols. In one embodiment, the format for the PLSCODE 660 is modified from the DVB-S2 standard so that the seven bits carried inform receivers about the modcode (4 bits) and provide sub-channel identifier information (3 bits). In other embodiments, other formats are possible, with signaling data 515 of different sizes and formats. The PLSCODE 660 may be protected by a very low rate code to ensure that it can be read correctly even in very poor SNR conditions.

The base-band frame 620 of FIG. 6A is made up of a base-band header 605, a data field 610, and padding 615. Data in the data field may, for example, include one or more stream encapsulation headers, each appended to one or more IP packets (e.g., together making up the set of data 540 described with reference to FIG. 5B). The data field 610 may include a number of stream encapsulation headers, each with an address label (e.g., the data link layer address or shortened identifier) indicating the terminal or terminals (within the sub-channel) to which the packet will be directed. Packets associated with the same modcodes will typically be transmitted in the same base-band frame 620, although they may be combined for packing efficiency. The DVB-S2 specification provides that certain frames will be of fixed size regardless of the modcode used (i.e., a normal FEC frame is 64,800 bits, and a shortened FEC frame is 16,200 bits), leading to frames with different time durations. However, in some embodiments, frame size may be varied according to the modcode selected for the frame, to thereby produce frames of uniform duration in time.

Interleaving and FEC encoding (e.g., BCH and LDCP) may then be performed on the base-band frame 620. This produces a FEC Frame 640, made up of an encoded base-band frame 625 with outer coding parity bits 630 and inner coding parity bits 635 appended. While, as noted above, the DVB-S2 specification provides that the FEC frame 640 will be of fixed data size, in other embodiments, the FEC frame 640 size may vary according to the modcode selected for the frame, to thereby produce frames of substantially uniform duration in time.

The FEC frame 640 is bit mapped to the applicable constellation (e.g., QPSK, 8PSK, 16APSK, 32APSK) to produce a XFEC frame 645. The XFEC frame 645 may be the payload data 520 of FIGS. 5A and 5B. A PL header 650 is added to the XFEC frame 645, together forming the PL frame 665. The PL header 650 (which may be the header 505 of FIG. 5A) is formatted as described above and encoded. The PL frame 665 is then baseband shaped and quadrature modulated, as well as amplified and upconverted to be transmitted downstream.

Figure 6B:
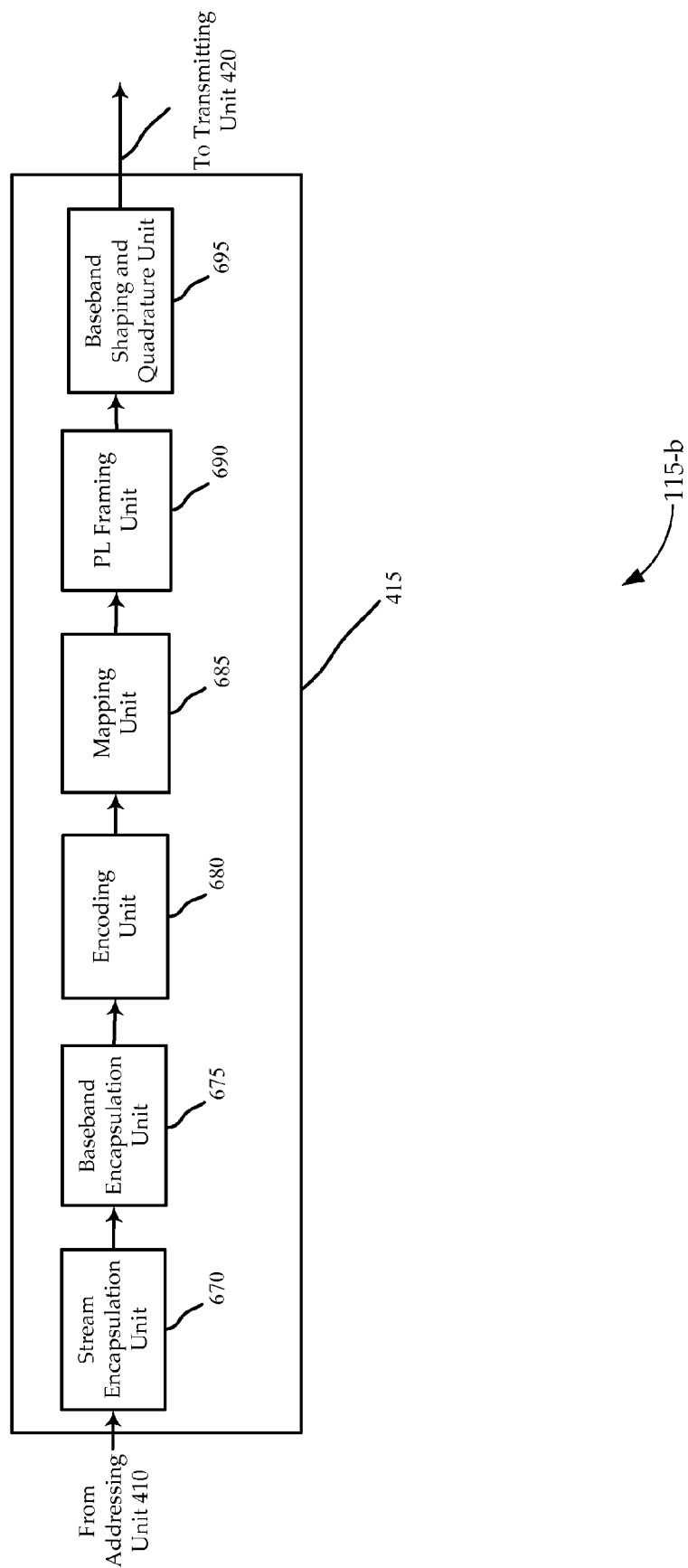
FIG. 6B is a block diagram of an encapsulating unit in a gateway device configured according to various embodiments of the invention.

FIG. 6B is a block diagram illustrating an example of selected units of the encapsulating unit 415 of the gateway 115-b of FIG. 4, configured to perform aspects of the formatting discussed with reference to FIG. 6A. In this embodiment, the encapsulating unit 415 includes a stream encapsulation unit 670, a base-band encapsulation unit 675, an encoding unit 680, a mapping unit 685, a PL framing unit 690, and a baseband shaping and quadrature unit 695. For purposes of this description, assume the system 100 of FIG. 1, utilizing the single carrier ACM waveform transmitted downstream to a subscriber terminal 130 from a gateway 115-b. It is, nonetheless, worth noting that in different embodiments, the encapsulation and modulation techniques described above may be undertaken by a range of components.

In one embodiment, PL frames 665 (and, thus, each corresponding base-band frame 620 encapsulated therein) are mapped one for one for each sub-channel. Thus, it will be worthwhile to introduce certain principles related to sub-channel assignment and allocation, while noting that these will be developed in FIGS. 7-8. Consider that gateway 115-b has received and encapsulated data destined for a subscriber terminal 130. For purposes of discussion, a set of frames for transmission to a particular subscriber terminal 130 receiving a first sub-channel are designated ($PLF1_a$, $PLF1_b$, $PLF1_c$, ... $PLF1_n$). Assume that there are eight sub-channels. In one embodiment, a round-robin technique is used where a first frame ($PLF1_a$) is mapped to the first sub-channel, a second frame (not destined for the terminal) is mapped to a second-sub channel, and so on up to an eighth frame for an eighth sub-channel. The second frame destined for the terminal ($PLF1_b$) is then mapped to the first sub-channel, and the round-robin format proceeds (i.e., $PLF1_c$, ... $PLF1_n$ are each mapped to the first sub-channel in succession after each round). In this embodiment, each sub-channel corresponds to a set of subscriber terminals 130.

A number of other techniques of mapping frames to sub-channels may be used as well. For example, instead of a round-robin format, the sub-channel identifiers may be appended without the recurring order (e.g., based on the bandwidth requirements, or QoS, of the terminals for the sub-channel). Thus, allocation and assignment of sub-channels may be varied dynamically (e.g., a given sub-channel identifier could be used for a number of consecutive frames, or the allocation to a given sub-channel may be greater that other sub-channels). A number of hybrid schemes are possible as well, as is evident to those skilled in the art, and thus a variety of multiplexing techniques may be used at the gateway.

In this embodiment, an IP packet is received from the network 120 by the receiving unit 405 of the gateway 115-b. After some initial processing, the stream encapsulation unit 670 receives the IP packet (e.g., the data packet 535 of FIG. 5B), and encapsulates the IP packet, appending the stream encapsulation header (e.g., header 530 of FIG. 5B) to produce an encapsulated set of data (e.g., set of data 540 of FIG. 5B). In this embodiment, assume that the stream encapsulation header includes a shortened identifier (instead of a data link layer address). A base-band encapsulation unit 675 receives one or more such encapsulated IP packets, and identifies the modcode to be used for the subscriber terminal to which the packet is directed. In one embodiment, the block size for the data field 610 and padding 615 is fixed according to the DVB-S2 standard. In another embodiment, the base-band encapsulation unit 675 may look up the appropriate block size for the data field 610 and padding 615, to thereby produce a physical layer frame 665 that will be a constant duration relative to other physical layer frames 665. Note that this duration may be fixed (permanent or semi-permanent), or may be varied dynamically to account for traffic composition or other factors.

The base-band encapsulation unit 675 encapsulates the received packet in accordance with the applicable block size, to produce a base-band layer frame 620, including a base-band header 605, a data field 610, and padding 615. Data in the data field includes the stream encapsulation header and appended IP packet. An encoding unit 680 encodes the packet in accordance with the applicable coding (e.g., using BCH and LDCP) appending parity bits (630, 635) to produce a FECFrame 640. The FECFrame 640 then proceeds to the mapping unit 685, which maps the contents of the frame 640 to the constellation of the applicable modulation format to produce a XFECframe 645 made up of symbols representative of the encoded frame 640 contents. An encoded physical layer header indicative of the modcode used and including a sub-channel identifier (e.g., a modified PLHeader 650) is added by a PL framing unit 690 to produce a physical layer frame 665. The physical layer frame 665 is then baseband shaped and separated into in-phase and quadrature components by the baseband shaping and quadrature unit 695, and then processed by one or more amplifiers and an upconverter at the transmitting unit 420 to be transmitted as a downstream broadcast signal 135. This signal may be broadcast downstream 135, 150 through the satellite 105, to the subscriber terminals 130.

Figure 7:
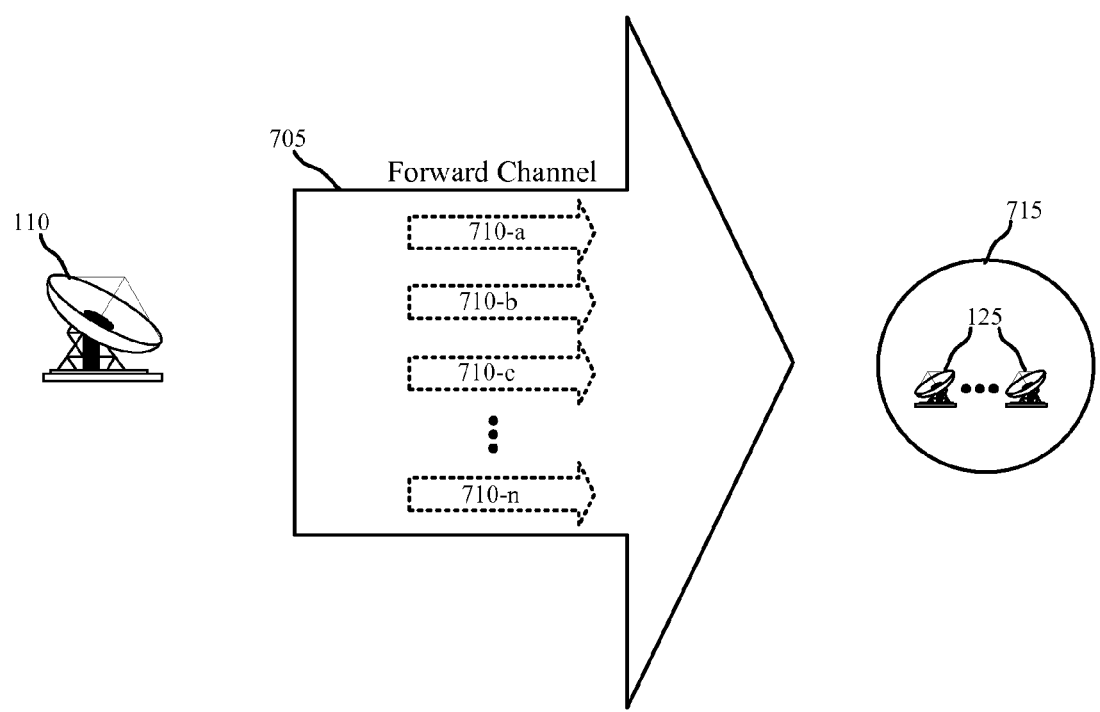
FIG. 7 is a channel diagram of a downstream channel diagram according to various embodiments of the invention.

Referring next to FIG. 7, a forward channel diagram 700 illustrating the sub-channel structure is shown for an embodiment of the invention. The illustrated channel 705 goes from a gateway antenna 110 to the subscriber terminal antennas 125 in a service beam area 715. The forward channel 705 operates at approximately 500 Mbps in this embodiment such that a service beam area 715 receives that bandwidth, but in other embodiments could be at or above 100 Mbps, 250 Mbps, 750 Mbps, 1 Gbps, or 1.5 Gbps. A single carrier is used for transporting the forward channel 705, but other embodiments could use multiple carriers. The subscriber terminal 130 for this embodiment tracks at full rate (e.g., 500 Mbps), but does not completely demodulate and decode at full rate. Full demodulation and decoding only occurs for assigned sub-channels 710 in the forward channel 705.

In this embodiment, the forward channel 705 is shown as an arrow encapsulating n dashed arrows, which are the n sub-channels 710. The sub-channels 710 may each be portions of the superframe. In one embodiment, the duration in time of the superframe does not change, but the size of the superframe varies in other embodiments. A recurring block size for each frame of a sub-channel 710 may be the same, or frames may vary in number and size. Some embodiments do not use superframes, but simply have sub-channels that are addressed to sets of subscriber terminals 130.

Subscriber terminals 130 may be configured to be capable of processing different amounts of the forward channel 705. Some embodiments of the subscriber terminal 130 may be configured to process at 1/16 datarate, 1/8 datarate, 1/4 datarate, 1/2 datarate, full speed or any other fraction of the full data rate. In some cases, the subscriber terminal 130 may be configured to be incapable of running beyond a specified fraction of the full rate or artificially capped even though capable of faster speeds.

Figure 8A:
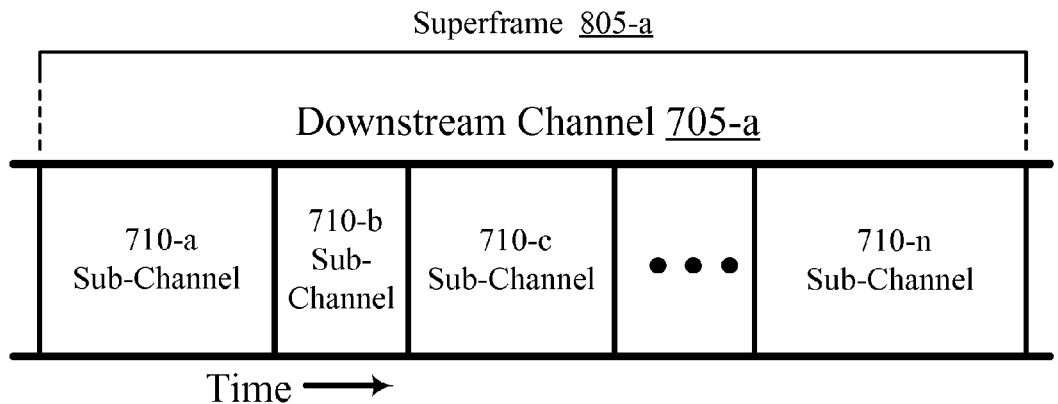
FIGS. 8A-8C are diagrams of various channel and sub-channel structures formatted according to embodiments of the invention.
Figure 8B:
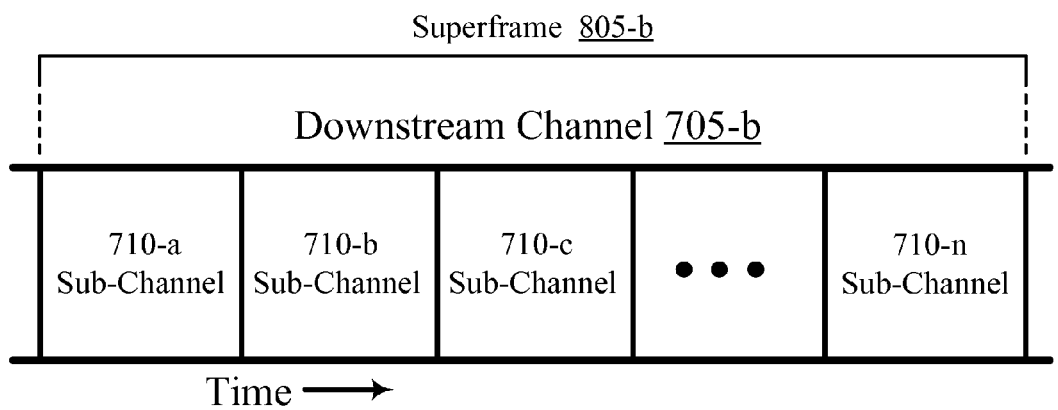
Figure 8C:
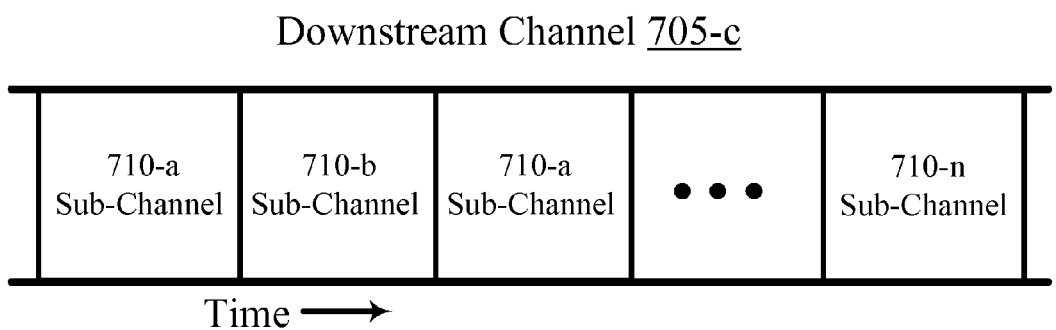

FIGS. 8A-8C illustrate various options for different embodiments of the channel 705. Referring first to FIG. 8A, an embodiment of a downstream channel 705-a is shown. This embodiment uses sub-channels 710 of a uniform block size in each superframe 805-a, and because of ACM, the duration in time of each sub-channel (and thus each frame) may vary. Thus, although the duration in time of each superframe will often vary in this embodiment, the number of frames and order of frames within each superframe will be constant.

Referring next to FIG. 8B, an alternative embodiment of a downstream channel 705-b is shown. This embodiment uses sub-channels 710 of a varied block size in each superframe 805-b, adapting block size in light of the applicable modcode, to produce sub-channels (and frames) of substantially uniform duration in time. Thus, the data size of each superframe will likely vary in this embodiment, but the number of frames per superframe 805-b and the order of sub-channels within each superframe 805-b will be constant. In other embodiments, a superframe 805 could be of constant duration in time, and the number of frames per superframe 805 and order of sub-channels within each superframe 805 could vary.

Referring next to FIG. 8C, an alternative embodiment of a downstream channel 705-c is shown. This embodiment uses sub-channels 710 of a varied block size, adapting block size in light of the applicable modcode, to produce frames of substantially uniform duration in time. However, in this embodiment, there is no superframe, and the order of sub-channels 710 may vary. In one embodiment, the sub-channels may be in any order. In other embodiments, the system could be set to have certain time slots for selected sub-channels, or have individual sub-channels not repeat more often than a certain threshold (e.g., more than 1 in 2, or 1 in 3 frames).

Figure 9:
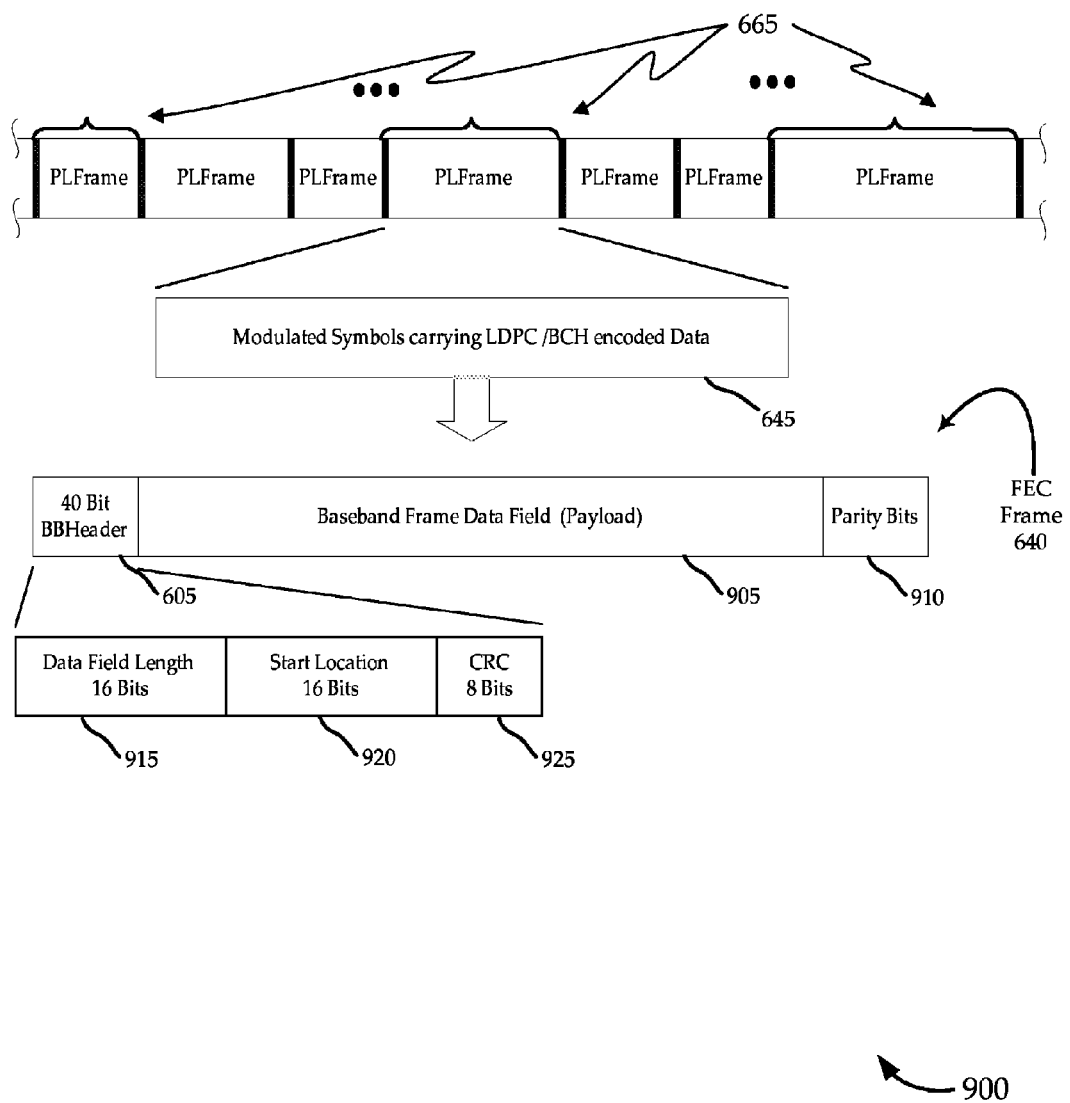
FIG. 9 is a block diagram illustrating the formatting for a series of physical layer frames according to various embodiments of the invention.

Referring next to FIG. 9, a block diagram illustrates an example data format 900 for a selected physical layer frame of a series of physical layer frames 665 (e.g., as generated for a downstream link by the gateway device 115 of FIG. 1 or 4). Although the PLFrames 665 of FIG. 6B are used to illustrate certain principles herein, those skilled in the art will recognize that the principles may be applied to other physical layer frames, as well. In one embodiment, each PLFrame 665 includes a physical layer header 650 and a modulated XFEC frame 645, as shown in FIG. 6B.

An example XFEC frame 645, made up of modulated symbols carrying LDCP/BCH encoded data, is illustrated in greater detail in FIG. 9. After demodulation and decoding, the XFEC frame 645 is a FEC frame 640, the FEC frame 640 including a baseband header 605, a baseband frame data field 905 (which may be the data field 610 and padding 615 FIG. 6A), and parity bits 910 (which may be the BCHFEC 630 and LDPCFEC 635 in FIG. 6A).

In one embodiment, the baseband frame data field 905 includes a number of headers with appended data packet(s) (e.g., the header 530 and appended data packet(s) 535 of FIG. 5B). The baseband header in one embodiment is made up of a 16 bit field for indicating the length of the data field 915, a 16 bit start location field 920, and an 8 bit CRC 925 (note that field sizes are for purposes of example only). The 16 bit start location field 920 may be used to indicate the start position of the first header. In one embodiment, the start location field may be used to indicate the first header location (in the baseband frame data field 905) when a fragment begins the baseband frame. Other baseband header 605 configurations are possible (e.g., fields for data link layer addressing, other addressing or filtering data, type data, data security or integrity information, control data, or other information on upcoming packets, etc.).

Figure 10A:
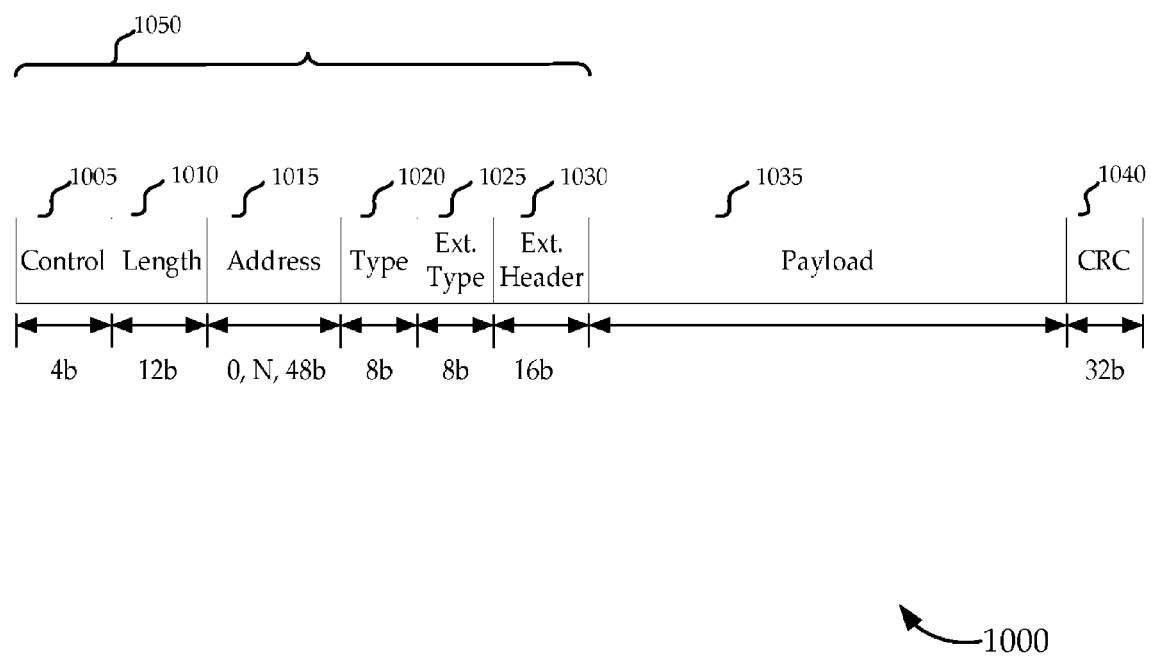
FIG. 10A is a block diagram illustrating the formatting for a stream encapsulation packet according to various embodiments of the invention.

Turning to FIG. 10, a block diagram illustrates an example format 1000 to implement the addressing functionality performed by the gateway 115-b of FIG. 4. The format may include a 4 bit control field 1005, a 12 bit length field 1010, a variable length address field 1015 (e.g., 0 bit, 4 bit, 8 bit, 12 bit, 16 bit, 24 bit, 32 bit, 48 bit, or any sub-combination thereof), an 8 bit type field 1020, an 8 bit extension type field 1025, a 16 bit extension header field 1030, payload 1035, and a 32 bit CRC 1040 (note that field sizes are for purposes of example only). In one embodiment, the address field 1015, extension type field 1025, extension header field 1030, and CRC 1040 are optional, although in other embodiments any combination of the field may be optional, mandatory, or excluded.

The illustrated format 1000 provides an example of a group of fields 1050 that may be used, for example, in a stream encapsulation header (e.g., header 530 of FIG. 5B). The control field 1005 may be used to indicate the size of the address field 1015 (e.g., as determined by the addressing unit 410 of FIG. 4). The control field 1005 may, if no address label is included, indicate the address to be used (e.g., a previous address, or an IP header within the payload 1035). The control field 1005 may also be used to indicate whether an optional extension type field 1025 or extension header field 1030 is present, and perhaps the length thereof. An extension type field 1025 may, for example, be used to indicate that the payload includes more than one type of data, identify the types of data included (e.g., IP packets, MPEG packets, DOCSIS packets, control data, etc.), and the identify the location of intermediate headers or other transitions.

The length field 1010 may indicate the length of the payload 1035, or the payload and header 1050. The payload 1035 may be the data packet(s) 535 of FIG. 5B. The payload may include one or more packets, and different types of data. The CRC 1040 may cover the header 1050 and payload 1035. In one embodiment, the CRC 1040 is optional and only is used to cover a packet fragmented across physical layer frames 665.

Figure 10B:
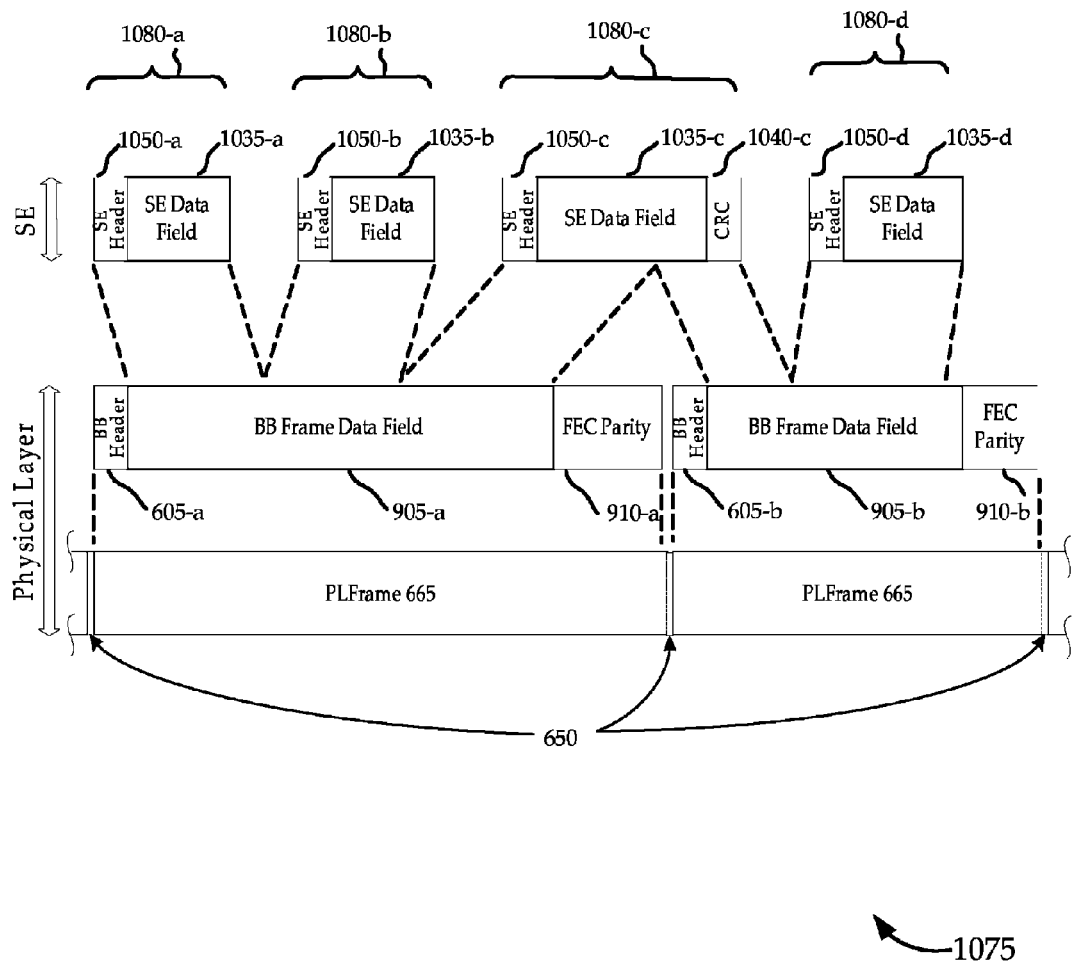
FIG. 10B is a block diagram illustrating an example integration of a stream encapsulation packet into a physical layer frame according to various embodiments of the invention.

Referring next to FIG. 10B, a block diagram illustrates an example of formatting 1075 for two of a series of physical layer frames 665 (e.g., as generated for a downstream link by the gateway device 115 of FIG. 1 or 4). The physical layer frames 665 may be the PLFrame 665 of FIG. 6A, with their associated PLHeaders 650 illustrated as well. FIG. 10B also shows an example illustration of the data fields of the FEC frame 640 of FIG. 9, and how a baseband header 605, baseband frame data field 905, and parity bits 910 may be matched one-for-one with a PLFrames 665 (i.e., one baseband frame 620 per PLFrame 665).

FIG. 10B further illustrates a number of stream encapsulation headers 1050 and associated data fields 1035, and how this data is packed in baseband frame data field 905. Four sets of stream encapsulation headers 1050 and associated data fields 1035 are shown, and each set makes up a stream encapsulation packet 1080. In a first baseband frame data field 905-*a*, two complete stream encapsulation packets 1080-*a* and 1080-*b* may be packed. However, only a fragment of a third stream encapsulation packet 1080-*c* will fit (including the header 1050-*c* and a first part of the data field 1035-*c*). In a second baseband frame data field 905-*b*, the remaining fragment of the data field 1035-*c* begins the third baseband frame, but does so without a new header. Instead, a CRC 1040-*c* is calculated and appended to the remaining part of 1035-*c*. The baseband header 605-*b* for the second baseband frame data field 905-*b* indicates where in the baseband frame data field 905-*b* the fourth stream encapsulation packet 1080-*d* will begin.

Figure 11:
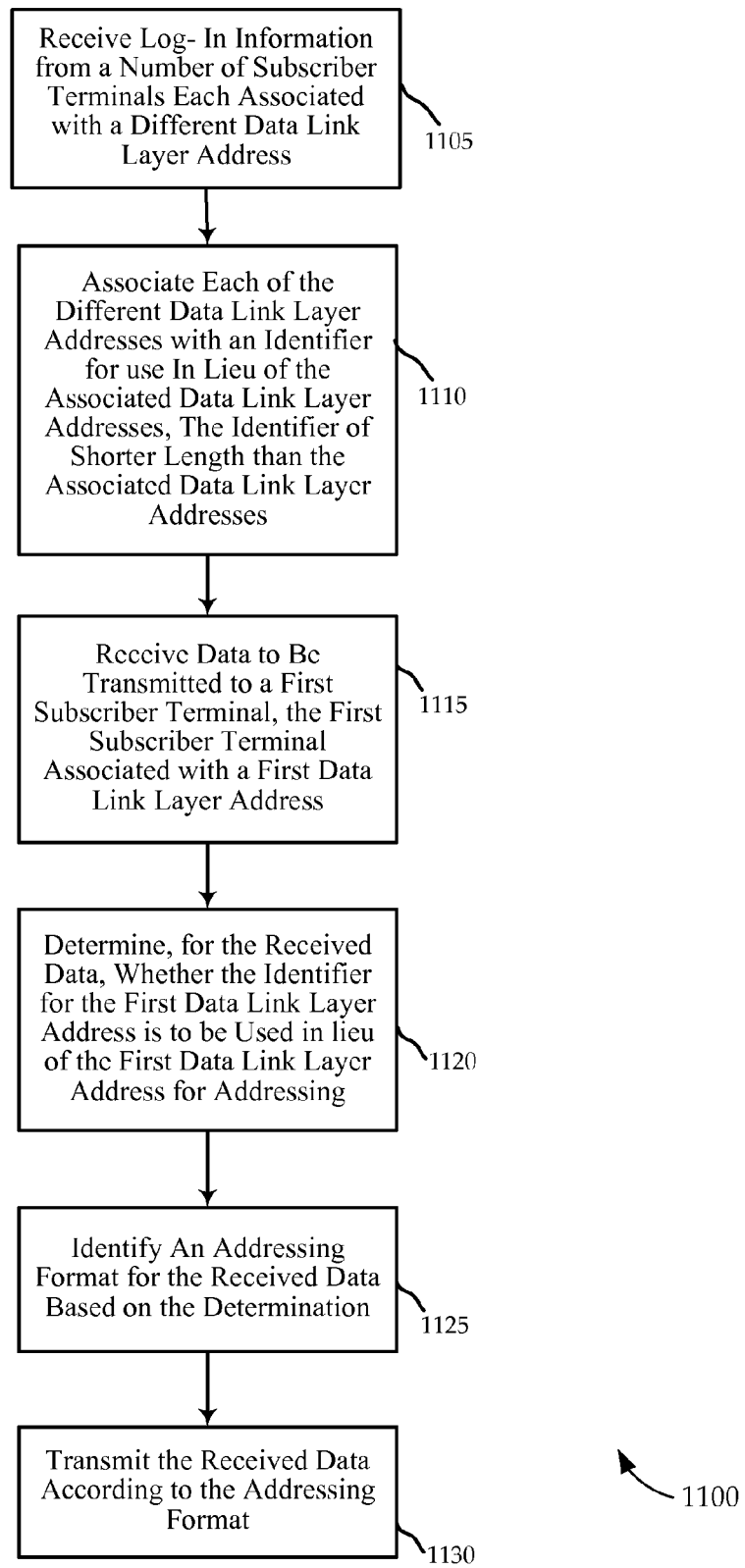
FIG. 11 is a flow diagram illustrating a method of packet addressing and formatting according to various embodiments of the invention.

Referring next to FIG. 11, a flowchart is shown illustrating a method 1100 for formatting data for a downstream link. The method may, for example, be performed in whole or in part by the gateway device 115-*b* described with reference to FIG. 4, or by other gateway 115 configurations described herein (e.g., FIG. 1 or 2).

At block 1105, log-in information is received from a number of subscriber terminals each associated with a different data link layer address. At block 1110, each of the different data link layer addresses is associated with a unique identifier for use in lieu of the associated data link layer addresses, the identifier being of shorter length than the associated data link layer addresses. Then at block 1115, data to be transmitted to a first of the subscriber terminal is received, the first subscriber terminal associated with a first data link layer address. At block 1120, a determination is made, for the received data, whether the identifier for the first data link layer address is to be used in lieu of the first data link layer address for addressing. At block 1125, an addressing format is identified for the received data based on the determination. At block 1130, the received data is transmitted according to the identified addressing format.

Figure 12:
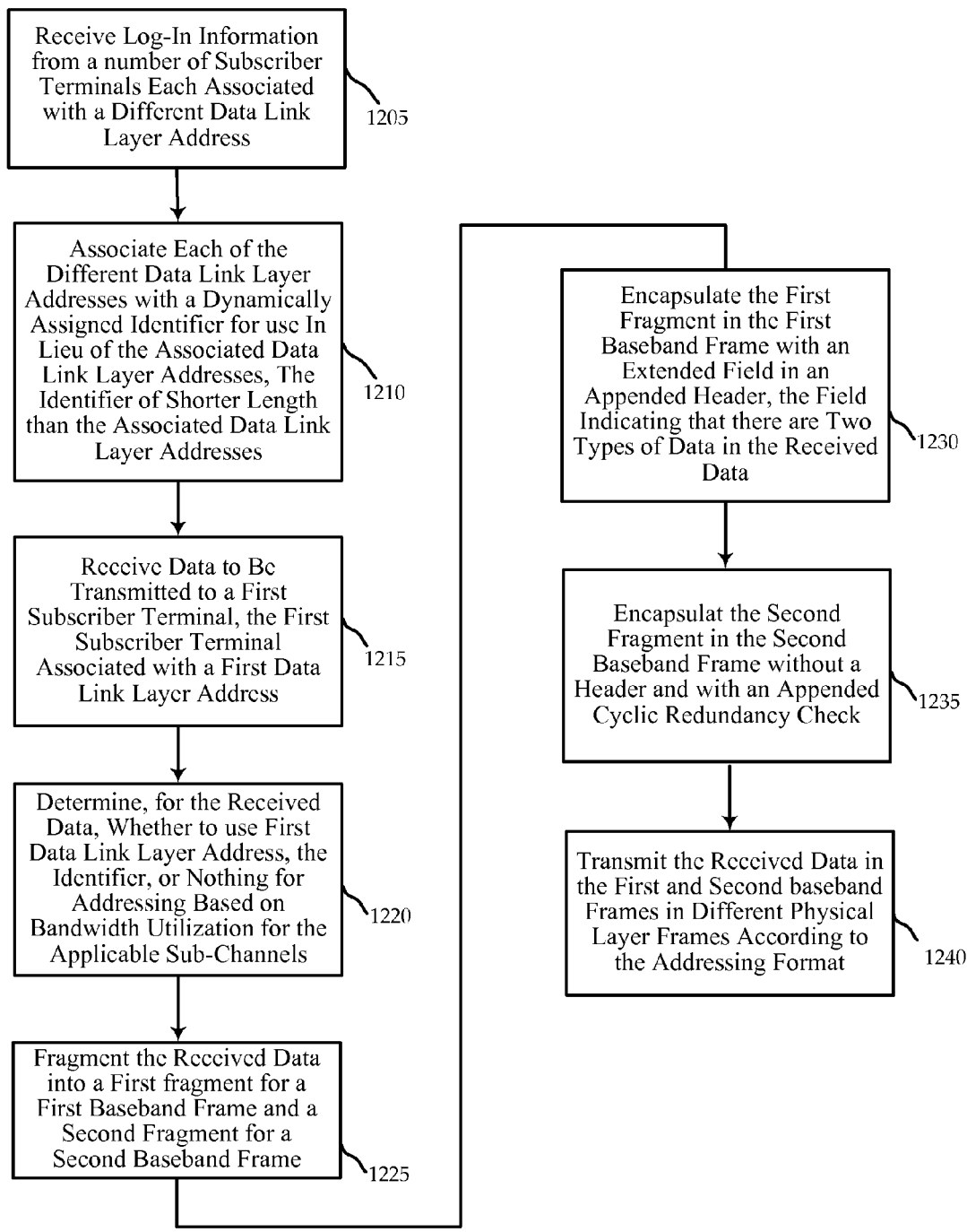
FIG. 12 is a flow diagram illustrating an alternative method of packet addressing and formatting according to various embodiments of the invention.

Referring next to FIG. 12, a flowchart is shown illustrating a method 1200 for formatting data for a downstream link. The method may, for example, be performed in whole or in part by the gateway device 115-*b* described with reference to FIG. 4, or by other gateway 115 configurations described herein (e.g., FIG. 1 or 2).

At block 1205, log-in information is received from a number of subscriber terminals each associated with a different data link layer address. At block 1210, each of the different data link layer addresses are associated with a dynamically assigned identifier for use in lieu of the associated data link layer addresses, the identifier of shorter length than the associated data link layer addresses. At block 1215, data is received which is to be transmitted to a first subscriber terminal, the first subscriber terminal associated with a first data link layer address.

At block 1220, a determination is made for the received data as to whether to use first data link layer address, the identifier, or nothing for addressing. The determination is based, at least in part, on bandwidth utilization for the applicable sub-channel. At block 1225, the received data is fragmented into a first fragment for a first baseband frame and a second fragment for a second baseband frame. At block 1230, the first fragment is encapsulated in the first baseband frame, wherein an appended header for the first fragment includes an extended field indicating that there are two types of data in the received data. At block 1235, the second fragment is encapsulated in the second baseband frame. The second fragment does not include an appended header, but has an appended cyclic redundancy check. At block 1240, the received data is transmitted in the first and second baseband frames (each in different physical layer frames), the transmission according to the addressing format.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. It is worth noting that the listed size fields are for illustrative purposes only. Thus, the fields may be contracted, or expanded, consistent with this disclosure. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A gateway device in a satellite communications system, the gateway device comprising:
   a receiver configured to:
      receive log-in information from a plurality of user terminals of the digital video broadcast satellite communications system, the user terminals each associated with a different data link layer address; and
      receive data to be transmitted to a first user terminal of the plurality of user terminals, the first user terminal associated with a first data link layer address;
   a processor, communicatively coupled with the receiver, and configured to:
      associate each of the data link layer addresses with an identifier for use in lieu of the associated data link layer addresses, the identifier of shorter length than the associated data link layer address;
      determine, for the received data, whether the identifier associated with the first data link layer address is to be used in lieu of the first data link layer address for addressing; and
      identify an addressing format for the received data based at least in part on the determination; and
   a transmitter, communicatively coupled with the processor, configured to transmit the received data according to the addressing format.

2. The gateway device of claim 1, wherein the processor is further configured to dynamically generate and assign the identifier to the first user terminal after the log-in information is received.

3. The gateway device of claim 1, wherein the processor is further configured to use a predetermined identifier for each of the plurality of user terminals.

4. The gateway device of claim 1, wherein the determination whether the identifier associated with the first data link layer address is to be used in lieu of the first data link layer address is made responsive to the load on the gateway device.

5. The gateway device of claim 1, wherein the determination whether the identifier associated with the first data link layer address is to be used in lieu of the first data link layer address is made responsive to bandwidth utilization for a sub-channel associated with the first user terminal.

6. The gateway device of claim 1, further comprising:
   an encapsulator, communicatively coupled with the processor, and the transmitter, and further configured to:
      include the addressing in the identified addressing format into a header; and
      encapsulate, in a baseband frame for transmission via a digital video broadcast signal, the header appended to at least some of the received data.

7. The gateway device of claim 6, wherein the encapsulator is further configured to include a field, in a baseband header of the baseband frame, indicating a location in the baseband frame of the addressing.

8. The gateway device of claim 6, wherein the encapsulator is further configured to begin the baseband frame with a fragment of a second set of received data without an appended header.

9. The gateway device of claim 6, wherein the encapsulator is further configured to dynamically determine whether to append a cyclic redundancy check to the received data, the determination made responsive to whether the received data is fragmented between a plurality of baseband frames.

10. The gateway device of claim 6, wherein the encapsulator is configured to:
    encapsulate received data including two or more types of data appended to the header, wherein the header includes an extendible field to signal the types of data in the received data.

11. A method of broadcasting in a satellite communications system, the method comprising:
    receiving log-in information from a plurality of user terminals of the satellite communications system, the user terminals each associated with a different data link layer address;
    associating each of the data link layer addresses with an identifier for use in lieu of the associated data link layer addresses, the identifier of shorter length than the associated data link layer addresses;
    receiving data to be transmitted to a first user terminal of the plurality of user terminals, the first user terminal associated with a first data link layer address;
    determining, for the received data, whether the identifier associated with the first data link layer address is to be used in lieu of the first data link layer address for addressing;
    identifying an addressing format for the received data based at least in part on the determination; and
    transmitting the received data according to the addressing format.

12. The method of claim 11, further comprising:
    dynamically generating the identifier for the first user terminal after the log-in information is received; and
    transmitting the dynamically generated identifier directed to the user terminal.

13. The method of claim 11, further comprising:
    using a predetermined identifier for the identifier for the first user terminal.

14. The method of claim 11, wherein the determination whether the identifier associated with the first data link layer address is to be used in lieu of the first data link layer address is made responsive to the load on the gateway device.

15. The method of claim 11, wherein the determination whether the identifier associated with the first data link layer address is to be used in lieu of the first data link layer address is made responsive to bandwidth utilization for a sub-channel associated with the first user terminal.

16. The method of claim 11, further comprising:
including the addressing in the identified addressing format into a header; and
encapsulating, in a baseband frame for transmission via the digital video broadcast signal, the header appended to at least some of the received data.

17. The method of claim 16, wherein the baseband frame is further configured to include a field, in a baseband header of the baseband frame, indicating a location in the baseband frame of the addressing.

18. The method of claim 16, further comprising:
inserting, into a beginning of the baseband frame, a fragment of a second set of received data without an appended header.

19. The method of claim 16, further comprising:
dynamically determining whether to append a cyclic redundancy check to the received data, the determination made responsive to whether the received data is fragmented between a plurality of baseband frames.

20. The method of claim 16, further comprising:
encapsulating received data including two or more types of data appended to the header, wherein the header includes an extendible field to signal the types of data in the received data.

21. A satellite communications system comprising:
a gateway device configured to:
receive log-in information from a plurality of user terminals of the digital video broadcast satellite communications system, the user terminals each associated with a different data link layer address;
associate each of the data link layer addresses with an identifier for use in lieu of the associated data link layer addresses, the identifier of shorter length than the associated data link layer addresses;
receive data to be transmitted to a first user terminal of the plurality of user terminals, the first user terminal associated with a first data link layer address;
determine, for the received data, whether the identifier associated with the first data link layer address is to be used in lieu of the first data link layer address for addressing;
identify an addressing format for the received data based at least in part on the determination; and
wirelessly transmit the received data according to the addressing format;
a satellite, in wireless communication with the gateway device, the satellite configured to:
receive the wirelessly transmitted data from the gateway device; and
retransmit the data received from the gateway device; and
a user terminal of the plurality of user terminals, in wireless communication with the satellite, the user terminal configured to receive the retransmitted data.

22. A gateway in a satellite communications system, the gateway comprising:
means for receiving log-in information from a plurality of user terminals of the satellite communications system, the user terminals each associated with a different data link layer address;
means for receiving data to be transmitted to a first user terminal of the plurality of user terminals, the first user terminal associated with a first data link layer address;
means for associating each of the data link layer addresses with an identifier for use instead of the associated data link layer addresses, the identifier of shorter length than the associated data link layer address;
means for making a determination, for the received data, whether the identifier associated with the first data link layer address is to be used instead of the first data link layer address for addressing;
means for identifying, responsive to the determination, an addressing format for the received data; and
means for transmitting the received data according to the identified addressing format.

23. The gateway of claim 22, wherein the determination whether the identifier associated with the first data link layer address is to be used in lieu of the first data link layer address is made responsive to the load on the gateway device and the bandwidth utilization for a sub-channel associated with the first user terminal.

24. A method of broadcasting in a satellite communications system, the method comprising:
receiving log-in information from a plurality of user terminals of the satellite communications system, the user terminals each associated with a different data link layer address;
associating each of the data link layer addresses with an identifier for use instead of the associated data link layer addresses, the identifier of shorter length than the associated data link layer address;
receiving data to be transmitted to a first user terminal of the plurality of user terminals, the first user terminal associated with a first data link layer address; and
transmitting the received data according to an addressing format comprising the identifier associated with the first data link layer address.

* * * * *